United States Patent [19]

Takano

[11] Patent Number: 4,538,489
[45] Date of Patent: Sep. 3, 1985

[54] METHOD AND APPARATUS FOR CUTTING OFF TOP SEAL PARTS OF CONTAINERS MADE OF SYNTHETIC RESIN

[75] Inventor: Motoharu Takano, Machida, Japan

[73] Assignee: Kewpie Kabushiki Kaisha, Tokyo, Japan

[21] Appl. No.: 402,437

[22] Filed: Jul. 28, 1982

[30] Foreign Application Priority Data

Jul. 28, 1981 [JP] Japan ................. 56-118030

[51] Int. Cl.³ .......................... B23B 3/04; B23B 5/14; B29D 23/03; B28B 7/14
[52] U.S. Cl. ........................................... 82/71; 82/73; 82/90; 82/101; 425/527; 425/806
[58] Field of Search ...................... 82/46, 47, 48, 100, 82/101, 102, 70.2, 71, 72, 73, 74, 90; 425/527, 806

[56] References Cited

U.S. PATENT DOCUMENTS

| | | | |
|---|---|---|---|
| 187,279 | 2/1877 | Hubel | 82/101 |
| 3,129,621 | 4/1964 | Makowski | 82/59 |
| 3,584,338 | 6/1971 | Fischer et al. | 425/527 |
| 3,818,785 | 6/1974 | Wakabayashi | 82/48 |
| 4,022,085 | 5/1977 | Zhiklenkox et al. | 82/59 |
| 4,235,137 | 11/1980 | Harman | 82/73 |

FOREIGN PATENT DOCUMENTS

| | | | |
|---|---|---|---|
| 384330 | 11/1964 | Fed. Rep. of Germany | 82/62 |
| 6875 | 6/1969 | Japan . | |
| 3350 | 4/1970 | Japan . | |
| 23584 | 11/1973 | Japan . | |
| 79112 | 4/1980 | Japan . | |

Primary Examiner—Francis S. Husar
Assistant Examiner—William E. Terrell
Attorney, Agent, or Firm—Oblon, Fisher, Spivak, McClelland & Maier

[57] ABSTRACT

The top seal parts of bottle-like containers made by blow-molding a flexible synthetic resin are cut off by nonrotatably supporting each container, pressing from one side a cutting edge of a cutter against a specific cutting line on the top part of the container, and rotating the cutter around the top part thereby to cut off the top seal part. This process can be carried out by an apparatus comprising a plurality of combinations of mechanisms, each combination comprising a fixing device for nonrotatably and fixedly supporting a container, a cutting head which can be fitted onto the top seal part of this container and can be driven in ascending, descending, and rotating movement, and cutting head drive.

5 Claims, 14 Drawing Figures

METHOD AND APPARATUS FOR CUTTING OFF TOP SEAL PARTS OF CONTAINERS MADE OF SYNTHETIC RESIN

BACKGROUND OF THE INVENTION

1. Field of the Invention

This invention relates to a method and apparatus for automatically and successively cutting off the top seal parts of containers made of synthetic resin traveling continuously along a production line.

2. Description of the Prior Art

Containers made of flexible synthetic resin, particularly blow-molded containers, ordinarily have top seal parts formed integrally with their opening or top parts. For this reason, it is necessary to cut off and remove these top seal parts in a process stage prior to charging the content product into the containers.

Heretofore, the principal means for cutting off the top seal parts of such containers have been: (A) that wherein, as each container is caused to rotate, a cutting blade is caused to move in a direction perpendicular to the axial direction of the container against the part to be cut off the top seal part thereby to cut off the same (as disclosed, for example, in Japanese Patent Publication Nos. 3350/1970 and 23584/1973); (B) that wherein each container is fixed, and its top seal part is sheared off by a pair of cutting blades (as disclosed, for example, in Japanese Patent Publication No. 6875/1969); and (C) that wherein each container is placed in a horizontal state, and, as it is being conveyed, its seal part is cut off by a fixed cutting blade (as disclosed, for example, in Japanese Patent Laid-Open No. 79112/1980).

However, in means wherein the cutting is performed as rotation is imparted to the container as in (A) above, it is necessary to so construct each of the support devices for supporting individual containers that they can rotate and, moreover, to provide a driving device for driving them in rotation. For this reason, the entire apparatus becomes very complicated, and, at the same time, unless rotation is imparted to each container as it is held in an upright state, the cut plane will not be flat. More particularly unless the container has a shape which is symmetrical around its centerline and, moreover, has a specific hardness or rigidity, the application of this means is difficult. Consequently, the containers to which this means can be applied is greatly restricted.

In means wherein the top seal part of the container is sheared off by a clamping action of a pair of shearing blades as in (B) above, or in means wherein cutting is accomplished by pressing the part of the container to be cut against a fixed knife as in (C) above, a force for pressing the cutter against the opening or top part of the container is additionally applied. For this reason, in the case of a circular top part, it is cut in a deformed elliptical shape by a force in a direction perpendicular to the cutter. Consequently, the cut edge tends to be deformed, whereby the screw threads around the top part of the container are apt to be damaged. In the case where the container is made of a flexible material, the cut edge is not flat, and the sealing effect when a cap is screwed onto the container top will be poor.

Furthermore, in an apparatus wherein cutting is carried out with each container placed in a horizontal state, it is necessary to feed the containers in upright state, thereafter to place them in horizontal state, to hold them in that state to carry out cutting, to place the containers once again in upright state, and to move the same to the succeeding process. For this reason, the entire apparatus unavoidably becomes large, and its mechanisms become complicated.

SUMMARY OF THE INVENTION

In view of this state of the prior art, it is an object of this invention to provide a method and apparatus for cutting off top seal parts of containers made of synthetic resin by which method and apparatus each top seal part can be cut with high precision at an accurately positioned part thereof, moreover without introduction of cutting chips or particles into the container, even when the containers to be cut are of irregular shape and, moreover, are made of flexible synthetic resin, and at the same time the entire apparatus can be made very compact.

According to this invention in one aspect thereof, briefly summarized, there is provided a method for cutting off the top seal parts of containers made of flexible synthetic resin and formed by blow-molding or a similar process, which method comprises, with respect to each container, nonrotatably supporting the container, pressing from a side direction a cutting edge of a cutter against a specific cutting part of the container for cutting off the top seal part thereof, and rotating the cutter around the top part of the container to thereby cut off the top seal part.

According to this invention in another aspect thereof, briefly summarized, there is provided an apparatus for cutting off the top seal parts of containers made of flexible synthetic resin and formed by blow-molding or like process, said apparatus comprising at least one combination of: a fixing device for fixedly holding a container holder nonrotatably supporting a container; a cutting head adapted to be fitted onto the top seal part of the container thus supported nonrotatably and to be driveable in ascending and descending movement and in rotation; and driving means for rotating the cutting head, the cutting head having: a part for fitting onto and positioning the top part including the seal part of the container thereby to determine the position of the cutting part thereof to be cut; a cutter provided with a cutter blade and being movable perpendicularly to the axis of the container thus positioned toward and against said cutting part; and a cutter actuating mechanism for thus moving the cutter toward and against the cutting part, the cutter blade thereby revolving around and cutting the cutting part as the cutting head is rotated and thereby cutting off the top seal part of the container.

The nature, utility, and further features of this invention will be more clearly apparent from the following detailed description with respect to one preferred embodiment of the invention when read in conjunction with the accompanying drawings, briefly described below.

BRIEF DESCRIPTION OF THE DRAWINGS

In the drawings

FIGS. 7A and 7C are plan views.

DETAILED DESCRIPTION OF THE PREFERRED EMBODIMENT

Figure 1A:
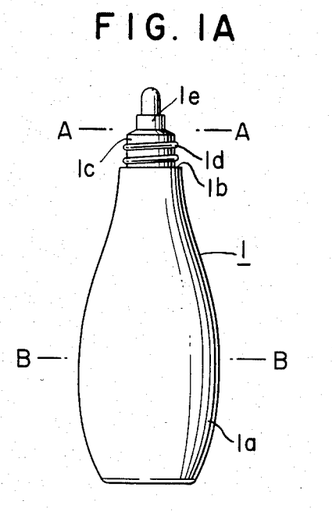
FIG. 1A is an elevational view of one example of a container whose top seal part can be cut off by the method and apparatus according to this invention.
Figure 1B:
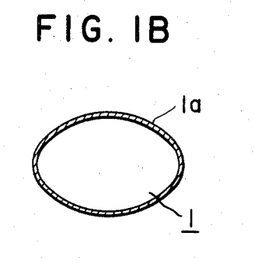
FIG. 1B is a cross section taken along the plane indicated by line B—B in FIG. 1A.

One example of a synthetic-resin container 1 whose top-seal part is to be cut off by the method and apparatus for cutting off the top-seal parts of containers according to this invention is shown in FIGS. 1A and 1B. This container 1, which is made of a flexible synthetic resin and formed by blow molding, has a container body part 1a and a shoulder part 1b at the upper part thereof. An opening part or top part 1c projects upward from the shoulder part 1b and has screw threads 1d formed therearound for securing a cap tightly thereto. A top seal part 1e is formed integrally with the top part 1c and extends upward or outward therefrom. This top seal part 1e is to be cut along the plane indicated by line A—A in FIG. 1A.

The top seal cutoff apparatus according to this invention has, as its principal component assemblies: a fixing device for fixedly holding container holders 2 which respectively nonrotatably support in an upright state the lower halves of the above described containers 1; a plurality of cutting heads 3 each of which is to be fitted onto the top 1c including the top seal part 1e and the shoulder 1b of the container 1 thus held within a respective container holder 2 and is so supported that it can be driven to ascend, descend and rotate; and driving means for driving the cutting heads in rotation. In the operation of this apparatus, a cutter 4 provided within each cutting head 3 is pressed against the cutting line A—A of the top seal part 1e of the container and, with a drawing slicing action due to the rotation of the cutting head 3, cuts into and cuts off the top seal part 1e.

Figure 2:
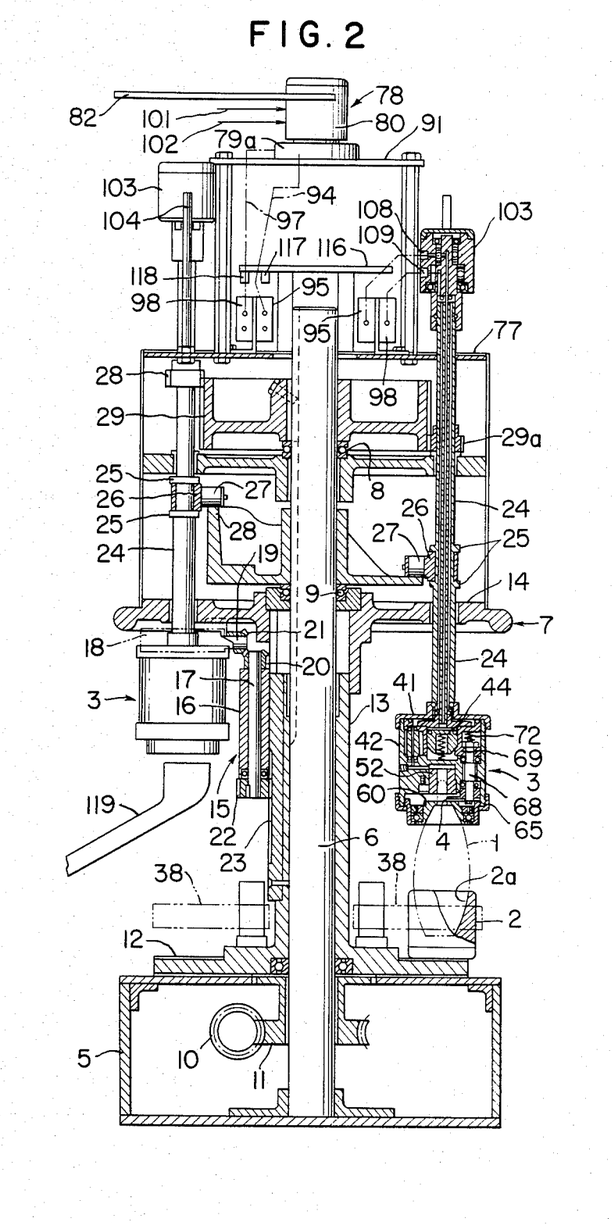
FIG. 2 is an elevational view partly in vertical section, showing one example of an apparatus for cutting off the top seal parts of containers according to the invention.
Figure 3:
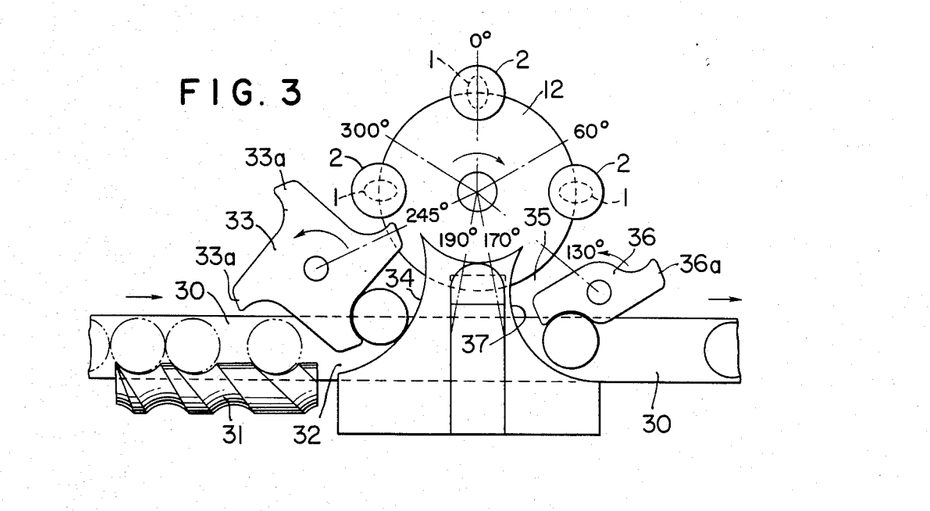
FIG. 3 is a simplified plan view showing one example of means for supplying and discharging containers in the apparatus shown in FIG. 2.

One example of specific structural organization of a top seal cutoff apparatus according to this invention is shown in FIGS. 2 and 3. The apparatus has a center post 6 (i.e. main column) around which a plurality of cutting heads 3 are suspended in circular arrangement and rotate about their own axes while revolving about the center post 6 relative to and in synchronism with the containers 1 supplied onto a revolving table. Each cutting head 3, which is of the rotating type, descends upon reaching a specific position and cuts off the top seal part 1e of a container 1.

More specifically, the center post 6 is nonrotatably mounted in upright state on a base structure 5. A revolving stand 7 is revolvably supported by bearings 8 and 9 on and around the center post 6. This revolving stand 7 is driven in rotation by a motor (not shown) through a worm 10 and a worm wheel 11 meshed therewith, both of which are disposed within the base structure 5, the worm wheel 11 being rotatably fitted around the center post 6.

The worm wheel 11 is coaxially fixed to the lower part of revolving table 12 revolvable about the center post 6 in a horizontal plane in the vicinity of the upper face of the base structure 5. A hollow shaft 13 integrally formed with the revolving table 12 and fitted around the center post 6 extends upward and is fitted at its upper end into the lower part of a stand plate 14. This stand plate 14 and the hollow shaft 13 are coupled together by an adjusting mechanism 15 for adjusting the height of the stand plate 14. Thus, the revolving table 12, the hollow shaft 13, the stand plate 14, and the adjusting mechanism 15 constitute parts of the revolving stand 7.

The adjusting mechanism 15 has a bearing 16 provided on the side face of the hollow shaft 13, a vertical shaft 17 inserted through the bearing 16, a bearing 18 provided on the lower face of the stand plate 14, and a horizontal shaft 19 inserted through the bearing 18. Bevel gears 20 and 21 respectively fixed to the upper end of the shaft 17 and the inner end of the shaft 19 are meshed with each other. A worm 22 is fixed to the lower end of the vertical shaft 17 and is meshed with a rack 23 formed in the vertical direction on the outer surface of the hollow shaft 13.

Accordingly, by rotating the horizontal shaft 19 by means of a suitable tool, the worm 22 can be rotated through the bevel gears 21 and 20 and the vertical shaft 17, whereby the worm 22 meshed with the rack 23 is caused to rise or descend, and the stand plate is moved up or down. Thus, the stand plate 14 can be adjusted in height in correspondence to the height of the containers 1 to be processed.

Through the above mentioned stand plate 14 near the outer periphery thereof, a plurality of (four in the instant example) vertical spindles 24 respectively of the aforementioned cutting heads 3, 3, . . . are passed at equal spacing angles around the center post 6. At an intermediate part of each of these spindles 24, a pair of spaced-apart flanges 25, 25 are fixedly provided and rotatably hold therebetween a cam-roller bracket 26 rotatably fitted around the spindle 24. A cam roller 27 rotatably supported on this bracket 26 is adapted to roll along an annular upper-surface cam 28 fixedly support on and around the center post 6.

Thus, each cutting head 3, including its spindle 24, is so suspended that it can be raised or lowered according to the shape of the cam 28. This cam shape is so designed as to impart the ascending and descending strokes of each cutting head 3 between the cutting position shown on the right-hand side of FIG. 2 and the raised and retracted position shown on the left-hand side of FIG. 2.

Furthermore, a gear 29a is fixed to each spindle 24 at another intermediate part thereof and is meshed with a fixed sun gear 29 in a manner permitting the gear 29a to slide in its axial direction, the sun gear 29 having a large width of face. The sun gear 29 is coaxially fixed to the center post 6. Thus, when the spindles 24 revolve around the center post 6 in accordance with the revolution of the revolving stand 7, the spindles are caused to rotate about their respective axes.

One example of means for supplying containers 1 onto the revolving table 12 of the revolving stand 7 is illustrated in FIG. 3. Previous to being thus supplied, each container 1 is so set in a preceding stage that the lower half of the container body is nonrotatably fitted in a container holder 2 and, thus set, is conveyed in upright state on a belt conveyor 30 in the arrow direction as shown in FIG. 3. From an intermediate point in this travel on the conveyor 30, the container holders 2 holding their respective containers 1 are engaged by a screw 31, which is positioned along one side of and substantially parallel to the conveyor 30. The screw 31 regulates the spacing between the holders 2, which are then fed into an entrance 32.

This entrance 32 leads into an inlet passageway defined on one side by a stationary guide wall 34 of concavely curved shape. On the opposite side of the passageway, there is provided a feed star wheel 33 rotating in the arrow direction and having teeth 33a, 33a, . . . each adapted to catch a respective container holder 2 which has been fed into the entrance 32 and to feed it along the inlet passageway to a specific position on the aforementioned revolving table 12 revolving in the arrow direction.

Each holder 2 is thereby carried on the revolving table 12 around a partial circular path, and the top-seal cutting off operation is carried out on the container 1 as described hereinafter. After this cutoff operation, each holder 2 and its container 1 reaches and enters an exit 35, which leads into an outlet passageway defined on one side by another stationary guide wall 37 of concavely curved shape. On the opposite side of the passageway, there is provided a discharge plate 36 rotating in the arrow direction and having teeth 36a, 36a, each of which functions to catch respective one holder 2 and to transfer it from the revolving table 12 onto the belt conveyor 30.

Each container holder 2 has a holding hole 2a formed therein with a shape which is coincident with that of the lower half of the body 1a of the container 1 and is such that the lower half of the body 1a will fit snugly thereinto, the open end of this hole 2a being at the upper surface of the holder 2. Since the cross-sectional shapes taken in horizontal planes of the container 1 itself are noncircular, the container, upon being fitted into the holding hole 2a, is held nonrotatably relative to the holder 2.

Figure 7A:
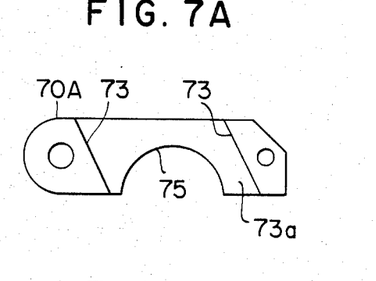
Figures 7B, 7D, 8, 9, 10:
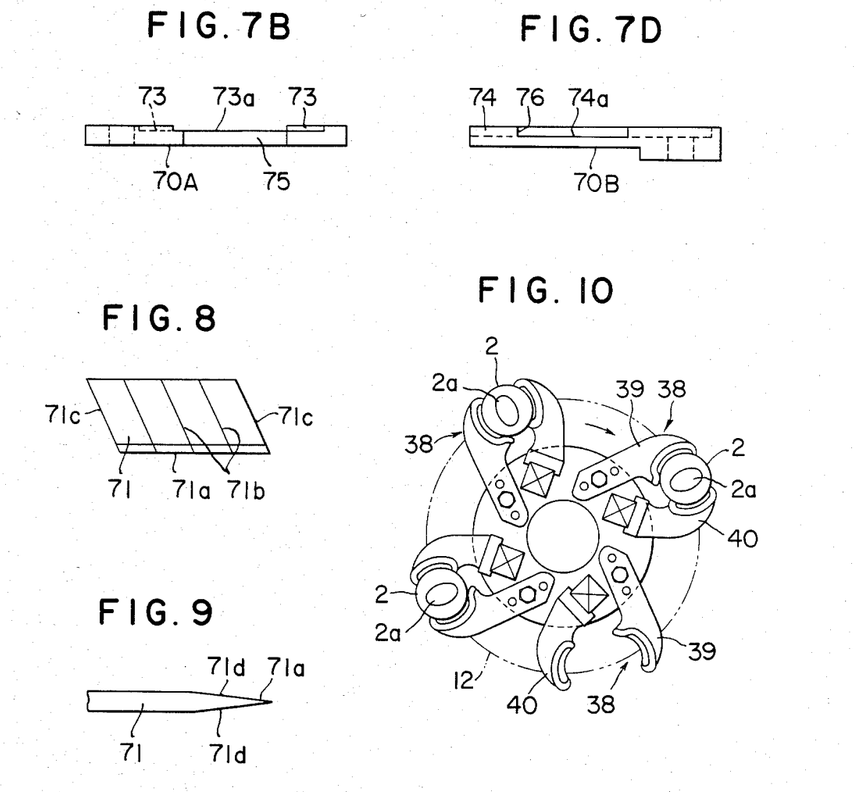
FIGS. 7B and 7D are side views, of holder parts of a cutter holder of the cutter shown in FIG. 6.
FIG. 8 is a plan view of a cutter blade to be held by the holder parts shown in FIGS. 7A through 7D.
FIG. 9 is a relatively enlarged cross sectional view showing the shape of the cutting edge of the cutter blade shown in FIG. 8.
FIG. 10 is a plan view showing fixing devices for fixedly holding container holders for holding, in turn, respective containers, these fixing devices being mounted on a revolving table in the apparatus shown in FIG. 2.

On and around the revolving table 12, as shown in FIGS. 2 and 10, fixing devices 38 for fixedly holding respective container holders 2 are mounted at positions corresponding to the cutting heads 3, 3, . . . Each fixing device in the instant example has a pair of jaw-like holding arms 39 and 40, of which the arm 39 is fixed to the revolving table 12, while the other arm 40 is swingable to clamp a container holder 2 from opposite sides. The swingable arm 40 is actuated in clamping action by a cam (not shown). Thus, these holding arms 39 and 40 operate to clamp and fix a holder 2 holding a container 1 and supplied onto the revolving table 12 as described above and to release this holder 2 at the exit 35. Since this mechanism is known, a detailed description thereof will be omitted.

One of the cutting heads 3, 3, . . . , which are all identical in construction, will now be described in detail with reference to FIGS. 4 through 9.

Figure 4:
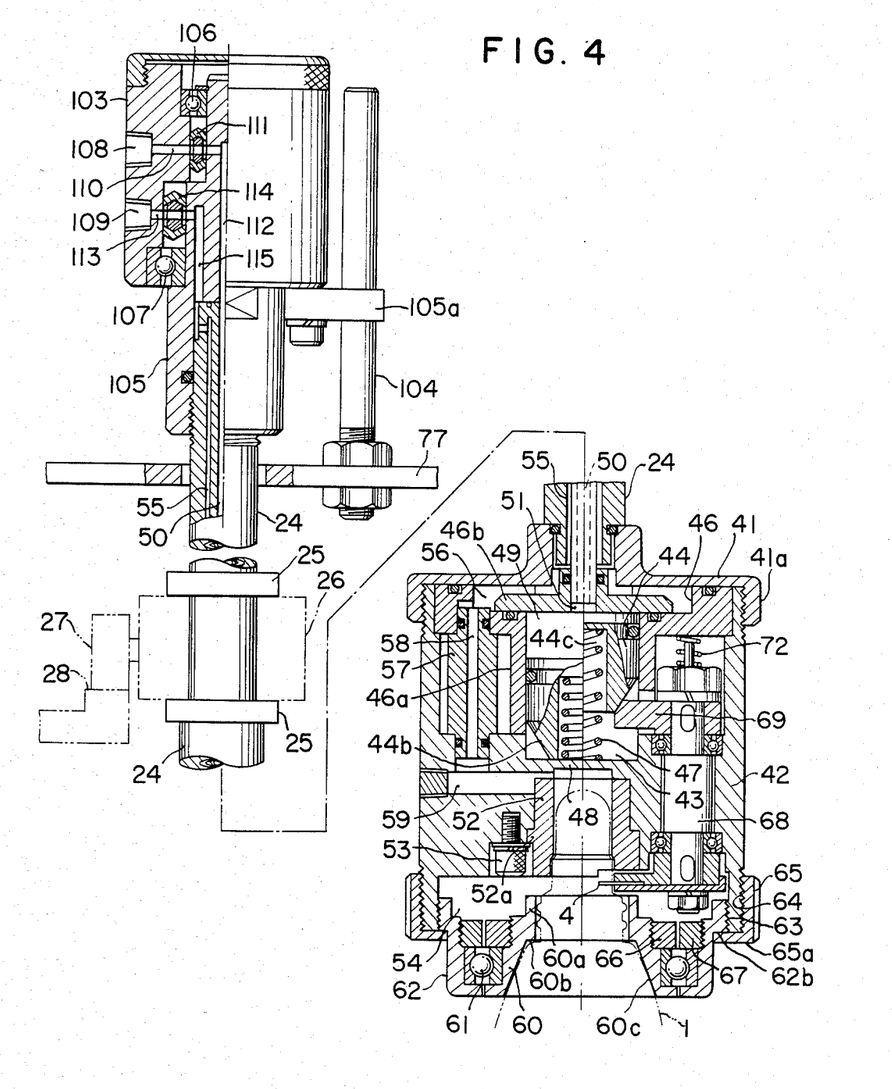
FIG. 4 is a relatively enlarged elevational view, with a spindle part cut away for foreshortening and some parts shown in vertical section, of a cutting head and related parts in the apparatus shown in FIG. 2.

Each cutting head 3 has an upper cap 41 of a shallow bell shape connected in a gas-tight state to the lower end of the corresponding spindle 24 and a cylindrical head case 42 having outer screw threads at its upper rim which are screwed into inner screw threads formed around the inner wall surface of a peripheral cylindrical wall part 41a of the cap, the cap 41 and the head case 42 thereby being fixed together. The head case 42 has formed therewithin an upper chamber 43, in which a cutter actuating cam 44 is inserted in a manner permitting its up-and down movement.

Figure 6:
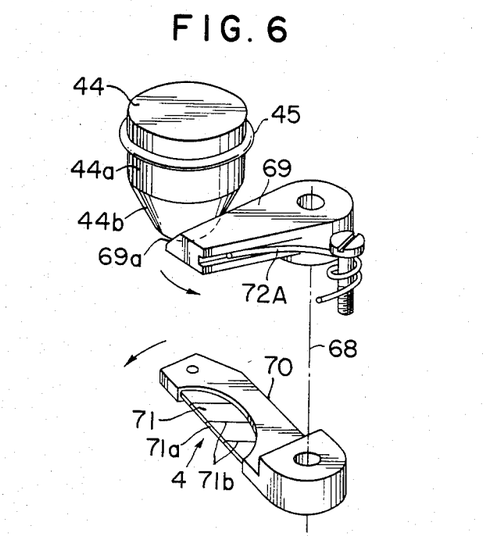
FIG. 6 is a relatively enlarged perspective view showing only the cutter and its actuating mechanism in the cutting head shown, in FIG. 4.

As shown in FIG. 6, the cutter actuating cam 44 comprises a cylindrical body part 44a and a cam part 44b of frustoconical shape contiguously formed below the body part 44a. A sealing member 45 is fitted around the cylindrical surface of the body part 44a of the cam and is in sliding yet gas-tight contact with the inner wall surface of a cylindrical part 46a of a cylinder member 46 enclosed within and fixed to the head case 42. Furthermore, a bore 44c closed at its upper end and open at its bottom end is formed in the axial direction in the cutter actuating cam 44, as shown in FIG. 4, and accommodates a compressible coil spring 47. This coil spring 47 is disposed in an elastically compressed state between the bottom 48 of the upper chamber 43 and the ceiling surface of the bore 44c and functions to return the cutter actuating cam 44 upward.

The upper part of the cylindrical part 46a of the above mentioned cylinder member 46 is gas-tightly closed by a cover member 46b. This cover member 46b, the cylindrical part 46a, and the upper surface of the cutter actuating cam 44 form a pressurized air chamber 49, which communicates via a center hole 51 in the cover member 46b with a pressurized air passage 50 formed axially through the corresponding spindle 24 described hereinbefore.

The above mentioned head case 42 is provided within its lower half part with a coaxially disposed, top seal receiving cylinder 52 having an inner diameter such that the top seal part 1e of a corresponding container 1 can fit snugly thereinto. This receiving cylinder 52 is interchangeable with a required number of similar receiving cylinders each having a respectively different inner diameter corresponding to the outer diameter of the top seal part 1e of a respective container 1. As means for detachably holding this interchangeable receiving cylinder 52 in mounted state, a stepped part 52a is formed at one part on the cylindrical outer surface thereof, and a holding screw 53 is screwed upward into the lower part of the head case 42 so that the head of the holding screw 53 engages and holds this stepped part 52a, preventing the receiving cylinder 52 from dropping out. Any of various other means can be used instead for this purpose.

The upper end of this receiving cylinder is open to the bottom part 48 of the head case 42, and, with a lower chamber 54 inclusive of this part, another pressurized air passage 55 through the spindle 24, separate from the pressurized air passage 50, is made communicative via a passage 56 formed between the cap 41 and the cover member 46b, a passage 58 through a hollow connecting strut 57 interposed between the cylinder member 46 and the head case 42 and functioning to fix their positions relative to each other, and a passage 59 formed in the head case 42.

At the lower end of the head case 42, a container positioning collar 60 for setting the depth of insertion of the container 1 and determining the cutting position of the top seal part 1e thereof is rotatably supported in coaxial relation to the top seal receiving cylinder 52. This container positioning collar 60 has a hollow interior whose wall surface comprises a top holding part 60a into which the outer periphery of the screw threads 1d of the container top 1c snugly fit, a downwardly facing shoulder abutting part 60b against which the shoulder part 1b of the container 1 abuts, whereby the insertion depth is determined, and a skirt part 60c of countersunk shape or concave frustoconical shape open at the lower end for grasping the upper part of the container body 1a below the shoulder part 1b.

The container positioning collar 60 is supported by a bearing 61 on an outer ring 62, whose upper end part is provided with outer screw threads 63 (left-hand screw) screwed into the lower end part of the head case 42. Moreover, the outer ring 62 has around its outer peripheral part an annular stepped part 62b, which is engaged by inwardly projecting flange 65a of a union nut 65 having inner screw threads meshed with outer screw threads 64 (right-hand screw) formed around the lower end part of the head case 42. Thus, the container positioning collar 60 is firmly yet rotatably supported relative to the cutting head 3. At the same time, by adjusting the depths of the screw engagements of the outer ring 62, the height position of the container positioning collar 60 can be adjusted, whereby the cutting line A—A of the container top part 1c can be selectively determined.

The above mentioned bearing 61 is held in assembled state by bearing retainers 66 and 67. By unscrewing the union nut 65 and the outer ring 62 supporting the positioning collar 60 from the head case 42 and removing the bearing retainers 66 and 67, the positioning collar 60 can be separated from the outer ring 62. Accordingly, if necessary, the container positioning collar 60 is also interchangeable, whereby a collar suitable for the shape and size of the containers to be cut can be selectively used.

The cutter 4 and its operation and mechanism will now be described. Within the head case 42 on one side thereof a vertical shaft 68 is rotatably supported to extend over the upper and lower chambers 43 and 54. A follower 69 and the cutter 4 are respectively fixed to the upper and lower ends of this shaft 68.

As shown in FIG. 6, the follower 69 is in the form of an arm whose proximal or inner end is fixed to the upper end of the shaft 68. This follower 69 has along one side thereof an inclined surface 69a obliquely facing upward and pressed against the cam part 44b of the aforementioned cutter actuating cam 44. The follower 69 is thereby forced to rotate in the counterclockwise direction (as viewed in FIG. 6) by a downward movement of the cam 44.

Figure 7C:
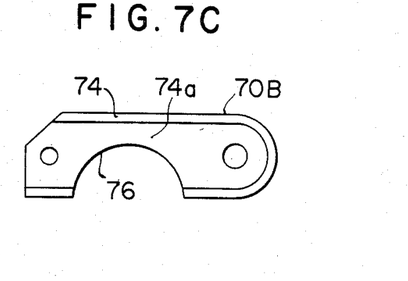

As shown in FIGS. 6 and 7, the cutter 4 secured to the lower end of the shaft 68 has a cutter holder 70 in the form of an arm whose proximal end is fixed to the shaft 68. This holder 70 holds a cutter blade 71 having a cutting edge 71a extending in exposed state along one lateral side of the holder 70 and aligned to coincide with the cutting line A—A of the container top 1c. When the follower 69 is positioned at the lower end of the cam part 44b of the cutter actuating cam 44, the cutter 4 is placed in a position where the cutting edge 71a is separated from the top seal part 1e of the container 1. The cutter holder 70 is fixed to the shaft 68 at an angular position relative to the follow 69 such that, when the follow 69 has been forced to rotate in the arrow direction by the descending movement of the cam 44, the cutting edge 71a can advance up to at least the vicinity of the diametric line of the container top seal part 1e.

A coil spring 72 is interposed in compressed state between the upper end of the shaft 68 and the lower surface of the upper flange part of the cylinder member 46 and exerts an elastic downward force on the shaft 68 thereby to continually maintain the cutter 4 at a constant position.. Furthermore, 'the above described follower 69 is urged by a spring 72A to rotate in the clockwise direction so as to be continually in contact with the cutter actuating cam 44.

In the example illustrated in FIGS. 7A through 7D, the above described cutter holder 70 is made up of two holder parts 70A and 70B, which are fitted together with the cutter blade 71 clamped therebetween in assembled state. The cutter blade 71 is of the type sold on the market as an interchangeable blade for knives and has grooved break lines 71b which are parallel and equally spaced and are oblique to the cutting edge 71a. The mating surface of one holder part 70A to be placed in contact with that of the other holder part 70B has a depressed middle part 73a having a depth corresponding to the thickness of the cutter blade 71 and having at its ends oblique stepped surfaces 73, 73 for engaging oblique end edges 71c, 71c of the blade 71. Thus, the blade 71 can be completely and snugly fitted in the depressed part 73a.

The other holder part 70B has depression 74a for receiving the holder part 70A, which depression is defined by an enclosing parapet-like ridge 74 formed partly around the periphery of the holder part 70B. The cutter holder 70 and the cutter blade 71 are assembled by placing the blade 71 in the depressed part 73a between the oblique surfaces 73, 73 of the holder part 70A and superimposing the other holder part 70B thereon to thereby clamp the blade 71 between the holder parts.

The holder parts 70A and 70B are provided at mutually coincident positions with arcuate cutouts 75 and 76, which serve to expose the cutting edge 71a of the blade 71 and receive the top seal part 1e of the container 1.

As shown in the cross-sectional view of FIG. 9, the cutter blade 71 in the region of its cutting edge 71a is of a double-beveled construction having beveled faces 71d, 71d on opposite sides thereof. When the top seal part 1e is being cut, the path of cutting of the container is guided, in effect, by this balanced construction of the beveled faces 71d, 71d, whereby biting of the cutting edge 71a toward one side is prevented. Thus, this cutting edge construction has an important function in producing a straight and smooth cut surface and in preventing the formation of chips and powder.

One example of a system for supplying pressurized air for actuating the cutter 4 will now be described.

An upper platform 77 is provided at the upper part of the revolving stand 7 and revolves unitarily therewith. On this upper platform 77 is erected a support structure including a top base plate 91, on which is mounted a pressurized air distributing device 78 of a construction as shown partly in vertical section in FIG. 5. This pressurized air distributing device 78 has a central revolving spindle 79 mounted at its base flange 79a on the base plate 91 and an outer cylinder 80 fitted around the spindle 79 and supported thereon by way of bearings 81, 81. The outer cylinder 80 is prevented from revolving by an arm 82 fixed thereto and extending outward therefrom to be fixedly engaged by a structure (not shown) fixed in space. Thus, the spindle 79 is revolvable relative to the outer cylinder 80, which is fixed.

Figure 5:
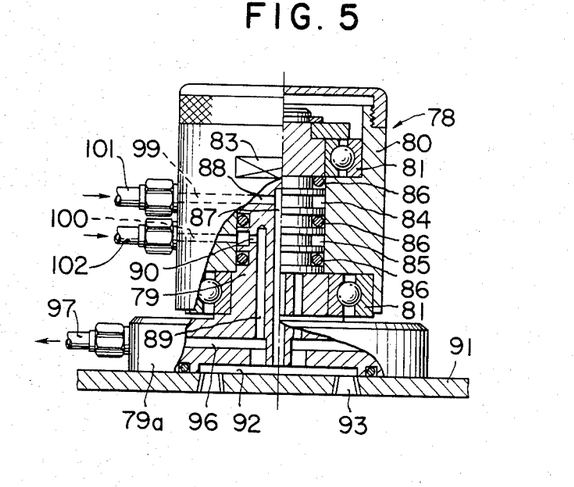
FIG. 5 is a relatively enlarged elevational view, with parts cut away and parts shown in vertical section of one example of a pressurized air distributing device in the same apparatus.

A plurality of (two in the instant example) annular inflow grooves 84 and 85 are formed at spaced-apart positions around the revolving spindle 79 at the part thereof around which the outer cylinder 80 is fitted. Seal rings 86, 86, 86 are respectively provided between the inflow grooves 84 and 85 and on the outer (upper and lower) sides thereof thereby to preserve gas-tightness mutually between these inflow grooves.

In a region of the spindle 79 inside of one inflow groove 84, a passage hole 88 is formed in the radial or horizontal direction and communicates with a central hole 87 formed along the axial center line of the spindle 79. In a relatively lower region of the spindle 79 inside of the other inflow groove 85, a plurality (the same number as the cutting heads 3) of passage holes 90 are formed in the radial direction, and each hole 90 communicates with a respective one of the same number of vertical passage holes 89 formed in annular arrangement around the central hole 87.

The lower end of the central hole 87 opens into a circular cavity 92 of relatively large diameter formed substantially coaxially in the bottom face of the base flange 79a of the spindle 79 contacting the base plate 91. This circular cavity 92 covers and communicates with a plurality of ports 93 formed through the base plate 91. Each port 93 is connected via a pipe 94 to a valve 95 mounted on the upper platform 77.

Each of the other passage holes 89 communicates through a passage 96 in the base flange 79a of the revolving spindle 79 and through a pipe 97 to a valve 98 also mounted on the upper platform 77.

The above described upper inflow groove 84 communicating by way of the passage hole 88 with the central hole 87 also communicates with a port 99 formed through the outer cylinder 80. The lower inflow groove 85 communicating with the passage holes 89 by way of passage holes 90 also communicates with a port 100 formed through the outer cylinder 80. The other, or outer, ends of these ports 99 and 100 are respectively connected through pipes 101 and 102 to a pressurized air supply source (not shown).

An upper end member 105 is fixed coaxially to the upper end of the spindle 24 of each of the cutting heads 3. An outer cylinder 103 is coaxially supported on this upper end member 105 by bearings 106 and 107 but is held and prevented from rotating by a holding arm 105a fixedly secured to an upright support post 104, which is fixed at its lower end to the upper platform 77. Accordingly, the upper end member 105 can rotate unitarily with the spindle 24 while the outer cylinder 103 remains stationary with respect to the upper platform 77 of the revolving stand 7.

The outer cylinder 103 is provided with pressurized air inlets 108 and 109 connected by way of the above mentioned valves 95 and 98 to the pressurized air supply source. One inlet 108 is communicatively connected by way of a passage 110 formed in the outer cylinder 103 and a V packing 111 interposed between the outer cylinder 103 and the upper end member 105 to a central passage 112 formed vertically through the center of the upper end member 105. The central passage 112 communicates at its lower end to the upper end of the aforementioned central passage 50 through the spindle 24. The other inlet 109 is communicatively connected by way of a passage 113 formed in the outer cylinder 103 and a V packing 114 interposed between the outer cylinder 103 and the upper end member 105 to a vertical passage 115 formed in the upper end member 105 and communicating at its lower end to the upper end of the aforementioned separate passage 55 through the spindle 24.

The above mentioned valves 95 and 98 each of a number corresponding to the number of cutting heads 3 are mounted on the upper platform 77. The opening and closing operations of these valves 95 and 98 and the timing thereof are carried out by cams 117 and 118 fixed to the lower face of a support plate 116 fixed in turn to the upper end of the center post 6.

The top seal parts 1e cut off by each cutter 4 are discharged through a chute 119.

The operation of the apparatus of the above described construction according to this invention will now be described.

Referring to FIGS. 3 and 10, the containers 1 to be processed which are nonrotatably fitted at their lower parts in respective holders 2 and are sent in upright state toward the revolving table 12 are spaced at equal intervals by the screw 31 and fed into the entrance 32. Thereupon one of the teeth 33a of the feed star wheel 33 engages the holder 2 of each container 1 and feeds it into position between a corresponding pair of holding arms 39 and 40 on the revolving table 12, the holder 2 then being grasped between the holding arms by the closing movement of the swingable arm 40 and thereby being fixed relative to the revolving table 12.

The revolving stand 7, together with the revolving table 12, is revolving, being driven by a motor (not shown) through the worm 10 and the worm wheel 11. Since the gear 29a fixed to the spindle 24 of each cutting head 3 is meshed with the sun gear 29 fixed to the center post 6 and revolves thereabout, the cutting head 3 is caused to rotate about its own axis, all cutting heads 3 thus rotating in the same direction.

The cutting head 3 immediately above the above described container 1 within the container holder 2 fixed by the fixing device 38 as described above is then caused to descend by the action of the cam 28, and its container positioning collar 60 fits onto the upper part of the container 1. Consequently, the top seal part 1e of the container 1 fits into the top seal receiving cylinder of the cutting head 3 in relative movement, and snug contact between the top holding part 60a and the screw threads 1d, between the shoulder abutting part 60b and the shoulder part 1b, and between the skirt 60c and the upper part of the container body 1a is obtained, whereby the container 1 is stably and securely held.

The valve 95 is then opened by the cam 117, and pressurized air supplied through the pipe 101 passes from the port 99 of the outer cylinder 80 of the pressurized air distributing device 78 and through the passage holes 88 and 87 of the revolving spindle 79, the cavity 92, the port 93, the valve 95 and the interior of the outer cylinder 103 and is introduced into the pressurized air passage 50 of the spindle 24. This pressurized air thereby enters the pressurized air chamber 49 and presses down on the upper surface of the cutter actuating cam 44 and forces this cam 44 to move downward, counter to the force of the coil spring 47.

As a consequence of this downward movement of the cutter actuating cam 44, its cam part 44b forces the follower 69 to rotate in its arrow direction of FIG. 6, against the force of the spring 72A. This rotation of the follower 69 is transmitted via the shaft 68 to the cutter 4 to cause it to rotate in its arrow direction of FIG. 6.

In the course of this rotation of the cutter 4, the cutting edge 71a of its cutter blade 71 contacts the cutting line A—A of the top seal part 1e of the container 1, and the cutting off of the top seal part 1e is accomplished by a drawing slicing action of the cutter blade 71, wherein it travels in the direction of its cutting edge 71a as well as toward the top seal part 1e relative thereto, as a result of the rotation of the cutting head 3 about its own axis. Since the cutting edge 71a of the cutter blade 71 is of double-beveled construction, in this case, there is no tendency in the advancing of the cutting action to veer up or down, the opposite beveled faces 71d, 71d functioning to guide the cutting action in a balanced dividing manner as it advances, and, at the same time, cutting chips or particles are not produced.

When the cutter actuating cam 44 has descended to the lowest position of its stroke as shown on the left side of FIG. 4, the cutter blade 71 of the cutter 4 has advanced to a position past the diametrical line of the top seal part 1e, whereby the top seal part 1e has been completely cut off.

when the container 1 has revolved approximately one half revolution as a result of the revolving of revolving table 12, the valve 95 is switched over to cause the pressurized air within the pressurized air chamber 49 to be discharged, whereby the cutter actuating cam 44 is forced by the elastic force of the compressed coil spring 47 to ascend and return to its upper position as shown on the right side of FIG. 4, and, since the follower 69 is then caused by the spring 72A to follow the cam part 44b of the cam 44, the cutter 4 retracts.

During the above described operation, the valve 98 is opened by the cam 118, and the pressurized air supplied through the pipe 102 is introduced through the port 100 and the passages 90, 89, and 96 of the pressurized air distributing device 78, the pipe 97, and the interior of the outer cylinder 103 into the pressurized air passage 55 of the spindle 24 and is further introduced by way of the passages 56, 58, and 59 within the cutting head into the upper part of the top seal receiving cylinder 52. This pressurized air thereby forcibly discharges downward the top seal part 1e cut off in the aove described manner and remaining in the receiving cylinder 52, and the top seal part 1e thus discharged is collected and recovered through the chute 119.

After the above described discharging action, the valve 98 is closed, and the supply of pressurized air is shut off.

After the top seal part 1e of a container 1 has been cut off, the swingable arm 40 of the fixing device fixing the holder 2 of that container 1 moves in the opening direction to release the holder 2, which then reaches the exit 35, where it is sent onto the belt conveyor 30 by one of the teeth 36a of the discharge plate 36 to be conveyed to the succeeding process.

The above described operation is carried out successively by the four cutting heads 3, 3, . . . respectively with respect to the container 1, 1, . . . sequentially fed onto the revolving table 12 and fixed thereto for cutting off their top seal parts 1e.

The example described above and shown in the drawings illustrates the case wherein the cutting heads 3 are disposed in a circle and revolve around the center post 6 and, as they thus revolve, also rotate about their respective axes relative to respective containers 1 fitted in holders 2 sent onto the revolving table 12 to thereby cut off the top seal parts 1e of these containers 1. In the case of small-quantity production, however, it is possible to provide a single cutting head 3 which can freely ascend and descend and to cut off the top seal parts 1e of the containers 1 one at a time. Also, the number of the cutting heads 3 in the case of their disposition in a circle around the center post 6 can be increased or decreased suitably in accordance with the production conditions.

Furthermore, the construction of the various parts of the apparatus need not be limited to that of the example described above and illustrated in the drawings. In addition, in the case of containers of a construction wherein the opening part or top thereof is not sealed, the method and apparatus of this invention can also be applied, of course, with high effectiveness when cutting off the superflous parts of the top parts of such containers. Even in the case of containers whose shapes in horizontal cross section are circular, the method and apparatus of this invention can be applied by providing simple means for preventing relative rotational slipping such as a pin in the bottom of the container holder 2.

Because of the construction and operation of the apparatus of this invention as described above, there is no possibility of excessive and harmful force being applied to the part of the container being cut, and the opening or top part thereof can be clearly cut without deforming to top part or damaging the screw threads thereof even when the container is molded from a flexible material. Particularly because of the drawing slicing action of cutting, the cut surface is flat and smooth, whereby, when a cap is screwed onto the top part of the container, the sealing effectiveness is high.

Furthermore, in accordance with this invention, the entire operation from the feeding of the containers, through the cutting of their tops, to the discharging thereof can be carried out with the containers in the upright state. For this reason there is no necessity of installing complicated mechanisms such as those to cause the containers to assume a prone or horizontal attitude and then to become upright, whereby the construction and operation of the entire apparatus can be made remarkably simple.

What is claimed as new and desired to be secured by Letters Patent of the United States is:

1. An apparatus for cutting off the top seal parts of containers made of flexible synthetic resin and formed by blow-molding or like process, said apparatus comprising:

a base;

means mounted on said base for fixedly holding a container holder nonrotatably supporting a container;

at least one cutting head supported by said base, so as to be movable up and down and to be rotatable about its longitudinal axis and adapted to be fitted onto the top seal part of the container thus supported nonrotatably;

means provided on said base for rotating the cutting head about its longitudinal axis and for moving the cutting head up and down;

a cutter provided with a cutter blade and being movable perpendicularly to said longitudinal axis of the cutting head so as to be positioned against the part to be cut;

a cutter actuating mechanism for moving the cutter against the part to be cut, the cutter blade thereby revolving around and cutting the part to be cut as the cutting head is rotated and thereby cutting off the top seal part of the container, wherein said cutter actuating mechanism further comprises a head case, a cylinder positioned in said head case and into which air is supplied; a cam positioned in said cylinder and having a conical cam surface and being so supported as to be movable upon a supply of said air to said cylinder in the direction of the axis of the conical cam surface, a cam follower biased against the cam surface and being moved thereby when the cam is thus moved, compressed air means in communication with said cylinder for driving the cam to move axially, a transmitting member for holding one end of said cutter, connecting the cam follower and the cutter and transmitting movement of the cam follower to the cutter to thereby move the cutter toward and against the part to be cut of the container; and container positioning means connected to said cutter for fitting onto and positioning the top part of the container, supported within the lower part of the cutting head and changeable to suit different dimensions and shapes of containers to be processed wherein said container positioning means is rotatably adjustably engaged with said lower part of the cutting head; wherein said means provided on said base for rotating the cutting head about its longitudinal axis and for moving the cutting head up and down further comprises a stationary center post mounted on said base; a revolving stand revolvably supported on the center post so as to revolve thereabout; driving means connected to said revolving stand for driving the revolving stand; and a plurality of spindles mounted on said center post and each including an air passage for supplying said air to said cylinder and supporting said cutting head and transmitting rotational power thereto, the at least one cutting head further comprising a plurality of cutting heads equally spaced on a circle about said center post wherein axial rovement of said cam means causes rotational movement of said cutter about said transmitting member in such a manner that said cutter is located in a retracted position of said head case and is rotated towards said part of said container to be cut when said top seal part of said container is cut.

2. An apparatus according to claim 1, wherein said container positioning means further comprises a container positioning collar rotatably supported within said lower part of said cutting head and a top seal receiving cylinder into which only the top seal part of said container fits.

3. An apparatus according to claim 2, wherein said container positioning collar further comprises a top holding part for being fitted onto and around the top part of the container, a shoulder abutting part for abuttingly contacting a shoulder part of the container to thereby limit the depth of fit of the cutting head onto and around the container, and a skirt part for fitting around and thereby guiding an upper part of the container.

4. An apparatus according to claim 2, wherein the cutter blade further comprises a double-beveled construction wherein opposite beveled faces of the blade converge to and meet at a cutting edge.

5. An apparatus according to claim 1, wherein said container positioning means further comprises a collar member which is rotatably adjustably engaged with the lower part of the cutting head.

* * * * *